United States Patent
Zeng et al.

(10) Patent No.: US 11,220,567 B2
(45) Date of Patent: Jan. 11, 2022

(54) HYDROPHOBICALLY MODIFIED ACRYLIC RHEOLOGY MODIFIERS HAVING HIGH CARBON NUMBER HYDROPHOBES

(71) Applicants: Rohm and Haas Company, Collegeville, PA (US); Union Carbide Corporation, Seadrift, TX (US)

(72) Inventors: Fanwen Zeng, Audubon, PA (US); Ying O'Connor, Coatesville, PA (US); Lyndsay M. Leal, Spring City, PA (US); Jennifer Koenig, Schwenksville, PA (US); Muhunthan Sathiosatham, Chalfont, PA (US); James Pawlow, Aurora, OH (US); Inna Shulman, Langhorne, PA (US); Sokhomari S. Suon, Ardmore, PA (US)

(73) Assignees: Rohm and Haas Company, Collegeville, PA (US); Union Carbide Corporation, Seadrift, TX (US)

( * ) Notice: Subject to any disclaimer, the term of this patent is extended or adjusted under 35 U.S.C. 154(b) by 6 days.

(21) Appl. No.: 16/756,481

(22) PCT Filed: Oct. 31, 2018

(86) PCT No.: PCT/US2018/058369
§ 371 (c)(1),
(2) Date: Apr. 16, 2020

(87) PCT Pub. No.: WO2019/089702
PCT Pub. Date: May 9, 2019

(65) Prior Publication Data
US 2021/0198399 A1    Jul. 1, 2021

Related U.S. Application Data

(60) Provisional application No. 62/581,899, filed on Nov. 6, 2017.

(51) Int. Cl.
*C08F 220/18* (2006.01)
*C08K 3/16* (2006.01)

(52) U.S. Cl.
CPC .............. *C08F 220/18* (2013.01); *C08K 3/16* (2013.01)

(58) Field of Classification Search
CPC ............................... C08F 220/18; C08K 3/16
USPC ........................................................ 524/401
See application file for complete search history.

(56) References Cited

U.S. PATENT DOCUMENTS

| | | | |
|---|---|---|---|
| 4,384,096 A | 5/1983 | Sonnabend | |
| 4,421,902 A | 12/1983 | Chang et al. | |
| 4,514,552 A | 4/1985 | Shay et al. | |
| 6,642,198 B2 | 11/2003 | Pflederer et al. | |
| 7,495,050 B2 | 2/2009 | Lai et al. | |
| 2008/0306218 A1 | 12/2008 | Madle et al. | |
| 2011/0065836 A1 | 3/2011 | Suau et al. | |
| 2011/0243873 A1 | 10/2011 | Hough et al. | |

FOREIGN PATENT DOCUMENTS

| | | | |
|---|---|---|---|
| EP | 0013836 | | 8/1980 |
| EP | 0013836 | * | 8/1986 |
| EP | 1272159 B1 | | 8/2009 |
| EP | 2475694 | | 7/2012 |
| WO | 2013045376 | | 4/2013 |

* cited by examiner

Primary Examiner — William K Cheung
(74) Attorney, Agent, or Firm — Kenneth Crimaldi

(57) ABSTRACT

A hydrophobically modified rheology modifier comprising:
(a) from 1 to 20 wt % polymerized units of $H_2C=C(R)C(O)O(CH_2CH_2O)_n(CH(R')CH_2O)_mR''$;
(b) from 35 to 75 wt % polymerized units of $C_1$-$C_4$ alkyl (meth)acrylates; and
(c) from 20 to 60 wt % polymerized units of $C_3$-$C_6$ carboxylic acid monomers;
wherein R is H or $CH_3$, R' is methyl or ethyl; R'' is $C_{29}$-$C_{60}$ alkyl; n is an average number from 20 to 100 and m is an average number from 0 to 50, provided that n≥m.

4 Claims, No Drawings

HYDROPHOBICALLY MODIFIED ACRYLIC RHEOLOGY MODIFIERS HAVING HIGH CARBON NUMBER HYDROPHOBES

This present application is a U.S. National Stage Entry of International PCT Application No. PCT/US2018/058369, filed Oct. 31, 2018, which claims the benefit of U.S. Provisional Patent Application Ser. No. 62/581,899, filed Nov. 6, 2017. The aforementioned applications are incorporated herein by reference in their entirety.

BACKGROUND

This invention generally relates to hydrophobically modified acrylic rheology modifiers.

Aqueous formulations typically use thickeners to obtain a desired rheology profile. One class of thickeners suitable for thickening aqueous formulations are alkali-soluble thickeners. These thickeners, also referred to as alkali-swellable thickeners, are copolymers formed by the polymerization of ethylenically unsaturated monomers and contain acid groups pendant to backbone of the copolymer. Alkali-soluble thickeners have also been prepared containing pendant nonionic surfactant groups or hydrophobes. These thickeners, known in the art as hydrophobically-modified alkali-soluble (swellable) thickeners, are characterized by increased thickening efficiency compared to alkali-soluble thickeners of similar composition and molecular weight. For example, U.S. Application Pub. No. 2011/0065836 discloses acrylic rheology modifiers containing hydrophobes.

The problem solved by the present invention is to provide additional hydrophobically modified (meth)acrylate rheology modifiers.

STATEMENT OF THE INVENTION

The present invention is directed to a hydrophobically modified rheology modifier comprising:
(a) from 1 to 20 wt % polymerized units of $H_2C=C(R)C(O)O(CH_2CH_2O)_n(CH(R')CH_2O)_mR''$;
(b) from 35 to 75 wt % polymerized units of $C_1$-$C_4$ alkyl (meth)acrylates; and
(c) from 20 to 60 wt % polymerized units of $C_3$-$C_6$ carboxylic acid monomers;
wherein R is H or $CH_3$, R' is methyl or ethyl; R'' is $C_{29}$-$C_{60}$ alkyl; n is an average number from 20-100 and m is an average number from 0-50, provided that n≥m.

The present invention is further directed to an aqueous composition comprising:
(i) from 0.1 to 5 wt % of a hydrophobically modified rheology modifier comprising:
(a) from 1 to 20 wt % polymerized units of $H_2C=C(R)C(O)O(CH_2CH_2O)_n(CH(R')CH_2O)_mR''$;
(b) from 35 to 75 wt % polymerized units of $C_1$-$C_4$ alkyl (meth)acrylates; and
(c) from 20 to 60 wt % polymerized units of $C_3$-$C_6$ carboxylic acid monomers;
wherein R is H or $CH_3$, R' is methyl or ethyl; R'' is $C_{29}$-$C_{60}$ alkyl; n is an average number from 20-100 and m is an average number from 0-50, provided that n≥m; and
(ii) from 0.4 to 5 wt % of at least one salt.

DETAILED DESCRIPTION OF THE INVENTION

All percentages are weight percentages (wt %), unless otherwise indicated and all temperatures are in ° C., unless otherwise indicated. Procedures are performed at room temperature (20-25° C.), unless specified otherwise. Weight average molecular weights, $M_w$, are measured by gel permeation chromatography (GPC) using polyacrylic acid standards, as is known in the art. The techniques of GPC are discussed in detail in Modern Size Exclusion Chromatography, W. W. Yau, J. J. Kirkland, D. D. Bly; Wiley-Interscience, 1979, and in A Guide to Materials Characterization and Chemical Analysis, J. P. Sibilia; VCH, 1988, p. 81-84. The molecular weights reported herein are in units of daltons. As used herein the term "(meth)acrylic" refers to acrylic or methacrylic. A "$C_3$-$C_6$ carboxylic acid monomer" is a mono-ethylenically unsaturated compound having one or two carboxylic acid groups, e.g., (meth)acrylic acid, maleic acid, fumaric acid, itaconic acid, maleic anhydride, crotonic acid, etc. Alkyl groups are saturated hydrocarbyl groups which may be straight or branched. In a preferred embodiment, the alkyl group R'' is a mixture of alkyl groups, in which case the carbon numbers for R'' are arithmetic number averages (Me).

Preferably, R'' is linear alkyl. Preferably, R'' is $C_{30}$-$C_{60}$ alkyl, preferably $C_{30}$-$C_{50}$ alkyl, preferably $C_{30}$-$C_{40}$ alkyl, preferably $C_{32}$-$C_{60}$ alkyl, preferably $C_{32}$-$C_{50}$ alkyl, preferably $C_{32}$-$C_{40}$ alkyl, preferably $C_{32}$-$C_{38}$ alkyl. Preferably, R'' is a mixture of alkyl groups having no more than 50 wt % linear $C_{28}$ alkyl, preferably no more than 40 wt %, preferably no more than 30 wt %, preferably no more than 20 wt %. In a preferred embodiment, R'' has the formula $CH_3(CH_2CHR^1)_iCH_2$—, wherein $R^1$ is hydrogen or methyl (preferably hydrogen) and i is from 7 to 19 (preferably at least 8, preferably at least 10; preferably no more than 17, preferably no more than 15, preferably no more than 13); when R'' is a mixture, i is a number average.

Preferably, n is at least 25, preferably at least 30, preferably at least 35, preferably at least 40, preferably at least 45; preferably no more than 90, preferably no more than 80, preferably no more than 70, preferably no more than 60. Preferably, n–m is at least 25, preferably at least 30, preferably at least 35, preferably at least 40. Preferably, m is from 0 to 30, preferably 0 to 20, preferably 0 to 10, preferably 0 to 5, preferably 0. Preferably, R' is methyl. Preferably, R is methyl.

Preferably, the rheology modifier comprises at least 70 wt % polymerized units of acrylic monomers, preferably at least 75 wt %, preferably at least 80 wt %, preferably at least 85 wt %, preferably at least 90 wt %, preferably at least 95 wt %. Acrylic monomers include (meth)acrylic acids and their alkyl or hydroxyalkyl esters, including monomers of structure $H_2C=C(R)C(O)O(CH_2CH_2O)_n(CH(R')CH_2O)_mR''$; crotonic acid, itaconic acid, fumaric acid, maleic acid, maleic anhydride, (meth)acrylamides, (meth)acrylonitrile and alkyl or hydroxyalkyl esters of crotonic acid, itaconic acid, fumaric acid or maleic acid. The rheology modifier may comprise polymerized units of non-acrylic monomers, e.g., vinyl esters, vinyl amides (including, e.g., N-vinylpyrrolidone), sulfonated acrylic monomers, vinyl sulfonic acid, vinyl halides, phosphorus-containing monomers, heterocyclic monomers, styrene and substituted styrenes.

Preferably, the rheology modifier comprises at least 25 wt % polymerized units of $C_3$-$C_6$ carboxylic acid monomers, preferably at least 30 wt %, preferably at least 35 wt %; preferably no more than 55 wt %, preferably no more than 50 wt %, preferably no more than 45 wt %. Preferably, the $C_3$-$C_6$ carboxylic acid monomer is a $C_3$-$C_4$ carboxylic acid monomer; preferably the $C_3$-$C_4$ carboxylic acid monomer is selected from among (meth)acrylic acid and maleic acid, preferably (meth)acrylic acid, preferably methacrylic acid.

Preferably, the rheology modifier comprises at least 40 wt % polymerized units of $C_1$-$C_4$ alkyl (meth)acrylates, preferably at least 45 wt %, preferably at least 48 wt %; preferably no more than 70 wt %, preferably no more than 65 wt %, preferably no more than 62 wt %. Preferably, the $C_1$-$C_4$ alkyl (meth)acrylate residues are $C_2$-$C_3$ alkyl (meth)acrylate residues, preferably $C_2$-$C_3$ alkyl acrylates, preferably ethyl acrylate. Preferably, the rheology modifier comprises at least 2 wt % polymerized units of $H_2C{=}C(R)C(O)O(CH_2CH_2O)_n(CH(R')CH_2O)_mR''$, preferably at least 3 wt %, preferably at least 3.5 wt %; preferably no more than 15 wt %, preferably no more than 12 wt %, preferably no more than 10 wt %, preferably no more than 8 wt %.

The rheology modifier may be a crosslinked polymer, i.e., it may comprise polymerized units of a crosslinker, such as, e.g., di- or tri-allyl ethers and di- or tri-(meth)acrylyl esters of diols or polyols (e.g., trimethylolpropane diallyl ether, ethylene glycol dimethacrylate), di- or tri-allyl esters of di- or tri-acids, allyl (meth)acrylate, divinyl sulfone, triallyl phosphate or divinylaromatics (e.g., divinylbenzene). Preferably, the amount of polymerized crosslinker units in the rheology modifier is no more than 1 wt %, preferably no more than 0.7 wt %, preferably no more than 0.4 wt %, preferably no more than 0.2 wt %, preferably no more than 0.1 wt %, preferably no more than 0.05 wt %.

The rheology modifier may be prepared by conventional methods of emulsion polymerization well known to those skilled in the art. Preferably, the rheology modifier has a weight average molecular weight in the range of from 100,000 to 10,000,000, preferably from 200,000 to 5,000,000. Preferably, the rheology modifier is provided as an aqueous composition containing the polymer as discrete particles dispersed in an aqueous medium. In this aqueous dispersion, the average particle diameter of the polymer particles is typically in the range of from 20 to 1,000 nm, preferably in the range of from 50 to 500 nm, and more preferably, in the range of from 75 to 350 nm. Particle sizes herein are those determined using a Brookhaven Model BI-90 particle sizer manufactured by Brookhaven Instruments Corporation, Holtsville, N.Y., reported as "effective diameter". The level of polymer particles in the aqueous dispersion is typically in the range of from 15 to 60 weight %, based on the weight of the aqueous dispersion.

Preferably, the rheology modifier is provided as an aqueous dispersion containing the polymerized monomers as a partly or fully solubilized polymer in an aqueous medium. Partly soluble polymer refers to a polymer that is not fully soluble in the aqueous medium, such as a swellable polymer particle that is enlarged by imbibing the aqueous medium but still retains some aspect of the particle shape. The solution containing the partly or completely solubilized polymer is characterized as having a translucent, semi-transparent, or transparent appearance. Suitable pH ranges for the aqueous solution of this embodiment are related to the level of pendant ionic groups attached to the polymer. A polymer containing less than 70 weight % acid monomer as polymerized units, based on the total weight of the polymer, is typically partly or completely soluble in an aqueous medium having a pH that is at or above the $pK_a$ of the pendant acid groups. For example, a polymer containing from 25 to 65 weight % polymerized acid monomer, based on the total weight of the polymer, is typically partly or completely soluble at a pH in the range of 5 to 14.

Suitable bases to adjust the pH of the polymer dispersion include mineral bases such as sodium hydroxide and potassium hydroxide; ammonium hydroxide; and organic bases such as triethylamine Mixtures of bases may be used.

Suitable acids to adjust the pH of the aqueous medium include mineral acid such as hydrochloric acid, phosphorus acid, and sulfuric acid; and organic acids such as acetic acid. Mixtures of acids may be used.

The rheology modifier is useful as a thickener for paints and other coating compositions, additive for cement products, paper coating thickener, rheology modifier for personal care products (e.g., shampoo, body wash), thickener for laundry detergent formulations, deicing fluids and adhesives, and as an additive for oilfield applications, e.g., oil-water clarification and water-in-oil separation.

The rheology modifier may be used in a "back-acid" formulation wherein the formulated polymer is partially neutralized at high pH, then re-acidified to lower the pH, as described in EP 1,272,159. The rheology modifier also may be used in formulations containing synthetic clays as co-thickeners, e.g., Laponite clays.

Preferably, the aqueous composition of this invention comprises at least 1 wt % salt(s), preferably at least 1.5 wt %, preferably at least 2 wt %; preferably no more than 4.5 wt %, preferably no more than 4 wt %. Preferably, the molar ionic strength of the aqueous composition is from 0.2 to 2; preferably at least 0.3, preferably at least 0.4, preferably at least 0.45; preferably no more than 1.5, preferably no more than 1, preferably no more than 0.75. Preferred salts include sodium chloride, magnesium chloride and a mixture thereof. Preferably, when the salt is magnesium chloride, its concentration is 0.4 to 3 wt %, preferably at least 0.7 wt %, preferably at least 1 wt %, preferably at least 1.3 wt %, preferably at least 1.6 wt %; preferably no more than 2.5 wt %, preferably no more than 2.2 wt %, preferably no more than 2 wt %. Preferably, the aqueous composition comprises at least 0.5 wt % of the hydrophobically modified rheology modifier, preferably at least 1 wt %, preferably at least 1.5 wt %, preferably at least 1.8 wt %; preferably no more than 4 wt %, preferably no more than 3.5 wt %, preferably no more than 3 wt %.

EXAMPLES

TABLE 1

| Ethoxylated linear >C22 hydrophobes from Baker Hughes. | | |
|---|---|---|
| Product | Average # carbons in hydrocarbon polymer chain | Average # of EO repeating units in ethoxylate |
| UNITHOX ™ 420 | 32 | 3 |
| UNITHOX ™ 450 | 32 | 13 |
| UNITHOX ™ 480 | 32 | 50 |
| UNITHOX ™ 490 | 32 | 115 |
| UNITHOX ™ 550 | 40 | 16 |
| UNITHOX ™ 750 | 50 | 20 |

Exp 1. Synthesis of Unithox 480 Methacrylate Via Zr Catalyzed Process: (Lipo-d)

A 2 L, 5-neck round bottom flask was fitted with an overhead stirrer, a temperature controller, an over temperature monitor, a gas inlet tube, and a 10-plate Oldershaw distillation column/distillation head with an automated reflux splitter/controller. The flask was charged with 251.8 g UNITHOX 480 (0.1 mol OH) and 307 g of methyl methacrylate (3.0 moles, 32:1 molar ratio MMA:Alcohol).

Inhibitors (MEHQ and 4-HT) were added to the flask contents in a concentration of 1070 ppm and 200 ppm in the final product, respectively.

Dehydration: The reaction mixture was dried by azeotropic distillation at reduced pressure (550 mm Hg) using the following procedure: the overhead stirrer was turned on to a speed of 120 rpm, and the reaction mixture was purged by bubbling with 8% $O_2$ in $N_2$. The contents of the reaction pot were heated to a setting of 105° C. As the temperature rose in the flask, the contents changed from a solid suspension to a clear solution (85-90° C.). The contents of the flask were heated to reflux for 60 minutes. Over this period, the vapor temperature was maintained around 75° C., as many water droplets were observed in the vapor return tube of the distillation head. After this time, distillate was removed using a reflux ratio of 7.5:1. Distillate was collected until no droplets of immiscible water were observed in the return (100 mL, 96 g). Upon cooling, about 4-5 mL of an aqeuous layer was observed in the distillate. The reaction pot was then cooled to 80° C. (to prevent precipitation of the Unithox 480 substrate) and the vacuum released from the system.

Transesterification: To the flask contents described above, 3.2 mole percent anhydrous $Zr(acac)_4$ (1.47 g, 0.003 mol) was added. The gas purge (8% $O_2$ in $N_2$) bubbling was started, and pressure of the flask was reduced to 550 mm Hg. The heating mantle temperature was set to 115° C. After 30 minutes, reflux began and the vapor temperature reached 92° C. The pot contents were refluxed for an additional 60 minutes, but no decrease in the vapor temperature was observed. No distillate was collected. The contents of the flask were then cooled to 85° C., and the vacuum was released.

A second charge of Zr catalyst, 2.11 g, 0.0043 mol, 7.3 mol % Zr) was added to the flask. The flask pressure was then reduced to 550 mm Hg, and the pot temperature setting restored to 115° C. After 30 minutes of heating, reflux began and the vapor temperature reached 92° C. The pot contents were refluxed for an additional 60 minutes, but no decrease in the vapor temperature was observed, indicating no generation of methanol. No distillate was collected. The contents of the flask were then cooled to 85° C., and the vacuum was released.

A third charge of Zr catalyst, 1.42 g, (0.003 mol, 10.8 mol % Zr) was added to the flask. The flask pressure was then reduced to 550 mm Hg, and the pot temperature setting once again restored to 115° C. After 30 minutes of heating, vapor reflux initiated and the vapor temperature was recorded at 92° C. The pot contents were refluxed for an additional 30 minutes, and the vapor temperature dropped to 82° C. Over a period of 30 minutes and using a reflux ratio of 7.5:1, 25 mL (23.9 g) of distillate was collected until the vapor temperature increased to 92° C. NMR analysis of the collected distillate indicated that the distillate contained 1.5 wt % MeOH, representing a conversion to ester of around 11.8%. A final dose of $Zr(acac)_4$ catalyst, 5.06 g, (0.010 mol, 38.5 mol % Zr) of was added to the flask and refluxed at 550 mm Hg pressure. This time, the temperature of the distillate vapor temperature rapidly dropped to 63° C. The contents were refluxed for 30 minutes, then distillate was removed used a reflux ratio of 7.5:1 until the vapor temperature rose to 92° C. The size of the fraction collected was 7.9 g. NMR analysis of the collected distillate indicated that the composition was 23.4 wt. % MeOH, accounting an additional 60.8% conversion of the alcohol group to the ester. NMR analysis of the reaction mixture indicated that the conversion of the alcohol group to the methacrylate moiety was virtually quantitative. A small amount of liquid was retained in the dry ice traps, which was not measured or analyzed.

Exp 2. HASE Polymers Containing UNITHOX-MMA (Lipo-d) at Various Levels were Prepared from a Conventional Emulsion Polymerization Table 2 summarizes the inventive examples (PE1 and PE 2) containing C>22 hydrophobe and comparative examples (PC-1 to 6) containing a C≤22 hydrophobe.

TABLE 2

| Sample ID | Composition |
|---|---|
| PC-1 | 59.5EA/31.5MAA/9 Lipo-a |
| PC-2 | 49.5EA/41.5MAA/9 Lipo-a |
| PC-3 | 59.5EA/31.5MAA/9 Lipo-b |
| PC-4 | 49.5EA/41.5MAA/9 Lipo-b |
| PC-5 | 57.2 EA/34.1 MAA/8.7 Lipo-c |
| PC-6 | 44.6EA/42.7MAA/12.7 Lipo-c |
| PE-1 | 56EA/40MAA/4.0 Lipo-d |
| PE-2 | 53.3EA/40MAA/6.7 Lipo-d |

Lipo-a is a lipophilically modified monomer having a linear saturated $C_{12}$ average carbon alkyl group connected through about 18-26 oxyethylene residue to a methacryloyl group. Lipo-b is a lipophilically modified monomer having a linear saturated $C_{18}$ average carbon alkyl group connected through about 18-26 oxyethylene residue to a methacryloyl group. Lipo-c is a lipophilically modified monomer having a linear saturated $C_{22}$ average carbon alkyl group connected through about 18-26 oxyethylene residue to a methacryloyl group. Lipo-d is a lipophilically modified monomer having a linear saturated $C_{32}$ average carbon alkyl group connected through about 50 oxyethylene residue to a methacryloyl group.

PE-1: 356.1 grams (g) deionized water was added to a 3-liter, 4-neck round bottom flask equipped with overhead stirrer, thermocouple, heating mantle, adapter inlet, Claisen head fitted with a water condenser and nitrogen inlet, and heated to 86° C. under nitrogen. To the heated water was added 8.0 g 28% Sodium Laureate Sulfate (SLS), 4.2 g of Cavasol (50%), rinsed by 7.0 g of deionized water. Previously prepared 25.1 g Monomer emulsion seed was added into the kettle through the port, followed by 21 g of deionized water and 0.3 g ammonium persulfate in 9.2 g of deionized water. Reaction exotherm was observed during next 1-2 minutes. To this heated mixture, as the peak of exotherm was over, the rest of the monomer emulsion containing 186.6 g of deionized water, 5.4 g aqueous solution of 28% Sodium Laureate Sulfate (SLS), 12 g Lipo-d, 168 g EA and 120 g MAA was metered in over 90 minutes followed by a deionized water rinse. A solution of 0.14 g ammonium persulfate in 27.5 g deionized water was added over 90 minutes concurrent with the addition of a monomer emulsion as the reaction temperature was kept at 85° C. At the completion of addition of the deionized water rinse, reactor contents were held for 5 min at 85° C. followed by the thermal chase of 0.12 g of ammonium persulfate in 34.4 g of deionized water at 85° C. for over fifteen minutes. At the end of the thermal chase kettle was cooled to 75° C.

The 3.0 g of aqueous solution containing 0.009 g of $FeSO_4.7H_2O$ was added followed by addition for over 20 minutes of 0.26 g of t-butylhydrogen peroxide (70%) in 7.0 g of deionized water and addition of 0.25 g isoascorbic acid in 7.0 g deionized water to the reactor maintained at 75° C. At the end of the Kettle chase the reactor contents were held at 75° C. for 20 minutes. After hold, kettle was then set on cooling further to 65° C. for over 20 min as 0.26 g of t-butylhydrogen peroxide (70%) in 7.0 g of deionized water and addition minutes 0.25 g isoascorbic acid in 7.0 g deionized water was added to the reactor. At the end of Drain tank chase, the latex was cooled to room temperature and then filtered.

Exp 3. Neutralized Viscosity in the Absence and Presence of 4% NaCl

Table 3 summarizes the neutralized viscosity data for 2% rheology modifier as well as the viscosity data after adding 4% of sodium chloride. The viscosity lost is the ratio of viscosity before and after the addition of NaCl.

TABLE 3

| Sample ID | Viscosity 2% Thickener (no salt) pH 7~7.5, cPs | Viscosity 2% Thickener + 4% NaCl pH 7~7.5 | Viscosity Lost |
|---|---|---|---|
| PC-1 | 19,000 | <100 | NA* |
| PC-2 | 20,000 | 3,000 | 85.0% |
| PC-3 | 173,000 | 1,000 | 99.4% |
| PC-4 | 205,000 | 27,000 | 86.8% |
| PC-5 | 384,000 | 40,000 | 89.6% |
| PC-6 | 312,000 | 11,000 | 96.5% |
| PE-1 | 60,000 | 27,000 | 55.0% |
| PE-2 | 65,000 | 29,000 | 55.4% |

*Polymer did not increase viscosity of solution to a measurable degree

Procedure (no salt): with mixing, add the rheology modifier to the water. Adjust pH to 7.0-7.5 with 20% sodium hydroxide solution. Continue mixing until uniform. Add preservative. Measure the viscosity after 24 hrs.
Procedure (salt): With mixing, add the rheology modifier to the water. Adjust pH to 7.5-8.0 with 20% sodium hydroxide solution. Continue mixing until uniform. Slowly add 4% NaCl to the gel. Adjusting speed to minimize aeration. If necessary, adjust to desire pH (7.0-7.5) with 25% citric acid solution or 50% sodium hydroxide solution. Add preservative. Measure the viscosity after 24 hrs.

Exp 4. Neutralized Viscosity in the Absence and Presence of 2% MgCl$_2$

Table 3 summarizes the neutralized viscosity data for 2% rheology modifier as well as the viscosity data after adding 2% of magnesium chloride. The viscosity lost is the ratio of viscosity before and after the addition of MgCl$_2$.

TABLE 4

| Sample ID | Viscosity 2% Thickener (no salt) pH 7~7.5, cPs | Viscosity 2% Thickener + 2% MgCl$_2$ pH 7~7.5, cPs | Viscosity Lost |
|---|---|---|---|
| PC-1 | 19,000 | <100 | NA |
| PC-2 | 20,000 | <100 | NA |
| PC-3 | 173,000 | <100 | NA |
| PC-4 | 205,000 | 3,000 | 98.5% |
| PC-5 | 384,000 | 1,000 | 99.7% |
| PC-6 | 312,000 | <100 | NA |
| PE-1 | 60,000 | 4,000 | 93% |
| PE-2 | 65,000 | 6,000 | 91% |

Procedure (no salt): with mixing, add the rheology modifier to the water. Adjust pH to 7.0-7.5 with 20% sodium hydroxide solution. Continue mixing until uniform. Add preservative. Measure the viscosity after 24 hrs.
Procedure (salt): With mixing, add the rheology modifier to the water. Adjust pH to 7.5-8.0 with 20% sodium hydroxide solution. Continue mixing until uniform. Slowly add 2% MgCl$_2$ to the gel. Adjusting speed to minimize aeration. If necessary, adjust to desire pH (7.0-7.5) with 25% citric acid solution or 50% sodium hydroxide solution. Add preservative. Measure the viscosity after 24 hrs.

Exp 5. Calculation of Ionic Strength for this Disclosure

The ionic strength of a solution is a measure of the concentration of ions in that solution. Ionic compounds, when dissolved in water, dissociate into ions. The total electrolyte concentration in solution will affect important properties such as the dissociation constant or the solubility of different salts. One of the main characteristics of a solution with dissolved ions is the ionic strength. Ionic strength can be molar (mol/L) or molal (mol/kg water) and to avoid confusion the units should be stated explicitly. The molar ionic strength, 1, of a solution is a function of the concentration of all ions present in that solution.

$$I = \frac{1}{2} \sum_{i=1}^{n} c_i z_i^2$$

where one half is because we are including both cations and anions, c, is the molar concentration of ion i (M, mol/L), z, is the charge number of that ion, and the sum is taken over all ions in the solution. For a 1:1 electrolyte such as sodium chloride, where each ion is singly-charged, the ionic strength is equal to the concentration. For the electrolyte MgSO$_4$, however, each ion is doubly-charged, leading to an ionic strength that is four times higher than an equivalent concentration of sodium chloride.
Generally multivalent ions contribute strongly to the ionic strength.
Ionic strength of the examples are calculated below:

| | MW | conc. % | M (mol/L) | Ionic strength (M) (mol/L) |
|---|---|---|---|---|
| NaCl | 58.4 | 4 | 0.685 | 0.685 |
| MgCl$_2$ | 95 | 2 | 0.211 | 0.526 |

The invention claimed is:
1. An aqueous composition comprising:
   (i) from 0.1 to 5 wt % of a hydrophobically modified rheology modifier comprising:
      (a) from 1 to 20 wt % polymerized units of H$_2$C=C(R)C(O)O(CH$_2$CH$_2$O)$_n$(CH(R')CH$_2$O)$_m$R";
      (b) from 35 to 75 wt % polymerized units of C$_1$-C$_4$ alkyl (meth)acrylates; and
      (c) from 20 to 60 wt % polymerized units of C$_3$-C$_6$ carboxylic acid monomers;
   wherein R is H or CH$_3$, R' is methyl or ethyl; R" is R" is C$_{29}$-C$_{60}$ alkyl; n is an average number from 20-100 and m is an average number from 0-50, provided that n≥m; and
   (ii) from 0.4 to 5 wt % of at least one salt, wherein the at least one salt is selected from the group consisting of sodium chloride, magnesium chloride and a mixture thereof.

2. The aqueous composition of claim 1 in which n is from 25 to 80, m is from 0 to 20, n–m is at least 25 and R" is $C_{32}$-$C_{60}$-alkyl.

3. The aqueous composition of claim 2 comprising:
(a) from 2 to 12 wt % polymerized units of $H_2C$=$C(R)C(O)O(CH_2CH_2O)_n(CH(R')CH_2O)_mR"$;
(b) from 40 to 65 wt % polymerized units of $C_1$-$C_4$ alkyl (meth)acrylates; and
(c) from 30 to 50 wt % polymerized units of acrylic acid, methacrylic acid or a combination thereof.

4. The aqueous composition of claim 3 comprising from 1 to 5 wt % of the at least one salt, wherein the at least one salt is selected from the group consisting of sodium chloride, magnesium chloride and a mixture thereof.

\* \* \* \* \*